US007336890B2

(12) United States Patent
Lu et al.

(10) Patent No.: US 7,336,890 B2
(45) Date of Patent: Feb. 26, 2008

(54) AUTOMATIC DETECTION AND SEGMENTATION OF MUSIC VIDEOS IN AN AUDIO/VIDEO STREAM

(75) Inventors: Lie Lu, Beijing (CN); Yan-Feng Sun, Beijing (CN); Mingjing Li, Beijing (CN); Xian-Sheng Hua, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1025 days.

(21) Appl. No.: 10/370,314

(22) Filed: Feb. 19, 2003

(65) Prior Publication Data

US 2004/0170392 A1 Sep. 2, 2004

(51) Int. Cl.
  H04N 7/00 (2006.01)
  H04N 5/91 (2006.01)
  H04N 5/93 (2006.01)
  G06K 9/46 (2006.01)
  G10L 11/00 (2006.01)
  G06F 15/173 (2006.01)

(52) U.S. Cl. .................... 386/96; 386/46; 386/52; 386/83; 382/190; 704/278; 709/224

(58) Field of Classification Search .................. 386/46, 386/52, 83, 95, 96, 98, 121, 125; 358/908; 382/176, 190; 704/278; 707/5, 104.1; 709/224; 715/719, 721
See application file for complete search history.

(56) References Cited

U.S. PATENT DOCUMENTS 5,649,060 A * 7/1997 Ellozy et al. ............... 704/278
5,793,366 A * 8/1998 Mano et al. ................ 715/839
5,864,868 A * 1/1999 Contois ................... 707/104.1
6,580,437 B1 * 6/2003 Liou et al. .................. 715/719
6,614,930 B1 * 9/2003 Agnihotri et al. ........... 382/176
6,816,858 B1 * 11/2004 Coden et al. ................. 707/5
6,819,863 B2 * 11/2004 Dagtas et al. ................ 386/46
6,998,527 B2 * 2/2006 Agnihotri .................... 84/609
7,046,914 B2 * 5/2006 Jasinschi et al. ............. 386/95
2004/0088723 A1 * 5/2004 Ma et al. ..................... 725/19

OTHER PUBLICATIONS

F. Arman, A. Hsu, and M.Y. Chiu, "Image processing on compressed data for large video databases", *Proceedings of 1st ACM International Conference on Multimedia*, Anaheim, CA, pp. 267-272, 1993.

(Continued)

*Primary Examiner*—Thai Q. Tran
*Assistant Examiner*—Syed Y. Hasan
(74) *Attorney, Agent, or Firm*—Lyon & Harr, LLP; Mark A. Watson (57) ABSTRACT

A "music video parser" automatically detects and segments music videos in a combined audio-video media stream. Automatic detection and segmentation is achieved by integrating shot boundary detection, video text detection and audio analysis to automatically detect temporal boundaries of each music video in the media stream. In one embodiment, song identification information, such as, for example, a song name, artist name, album name, etc., is automatically extracted from the media stream using video optical character recognition (OCR). This information is then used in alternate embodiments for cataloging, indexing and selecting particular music videos, and in maintaining statistics such as the times particular music videos were played, and the number of times each music video was played.

24 Claims, 4 Drawing Sheets

OTHER PUBLICATIONS

Hampapur, A., Jain, R., and Weymouth, T., "Digital Video Segmentation", *Proc. ACM Multimedia 94*, San Francisco, CA, Oct. 1994, pp. 357-364.

Ishwar K. Sethi, Nilesh Patel. "A Statistical Approach to Scene Change Detection." *SPIE* vol. 2420, 329-338, San Jose, California: 1995.

Hua, X., Chen, X., Wenyin, L., and Zhang, H. 2001. Automatic location of text in video frames. In *Proceedings of the 2001 ACM Workshops on Multimedia: Multimedia information Retrieval* (Ottawa, Ontario, Canada, Oct. 5-5, 2001). MULTIMEDIA '01. ACM Press, New York, NY, 24-27.

Chen, X. and Zhang, H. 2001. Text Area Detection from Video Frames. In *Proceedings of the Second IEEE Pacific Rim Conference on Multimedia: Advances in Multimedia information Proceeding* (Oct. 24-26, 2001). H. Shum, M. Liao, and S. Chang, Eds. Lecture Notes In Computer Science, vol. 2195. Springer-Verlag, London, 222-228.

T. Zhang, C.-C. Kuo: "Content-based Classification and Retrieval of Audio", SPIE's 43rd Annual Meeting—Conference on Advanced Signal Processing Algorithms, Architectures, and Implementations VIII, San Diego, Jul. 1998.

L. Lu, Stan Li, H, J. Zhang. "Content-based Audio Segmentation Using Support Vector Machines". *Proc. of ICME 2001*, pp. 956-959, Tokyo, Japan, 2001.

I. IDE, K. Yamamoto, H. Tanaka, "Automatic Video Indexing Based on Shot Classification, Advanced Multimedia Content Processing" First Intl. Conf. AMCP'98, Osaka, Japan-, S. Nisho, F. Kishino eds., Lecture Notes in Computer Science vol. 1554, Springer-Verlag (Mar. 1999).

\* cited by examiner

AUTOMATIC DETECTION AND SEGMENTATION OF MUSIC VIDEOS IN AN AUDIO/VIDEO STREAM

BACKGROUND

1. Technical Field

The invention is related to detecting particular video sequences in a multimedia broadcast stream, and in particular, to a system and method for automatically detecting and segmenting music videos in an audio-video media stream.

2. Related Art

Multimedia data streams such as, for example, audio-video streams including music or songs can be found in a number of environments, such as, for example, television broadcasts, or streaming data across a network such as the Internet. However, when such streams are captured or otherwise stored for later viewing or playback, it is often desirable to index, parse, or otherwise provide a capability to browse particular portions of the media stream. In order to efficiently access particular portions of a stored media stream, the media must be parsed or otherwise indexed or segmented into uniquely identifiable segments of content.

For example, a number of conventional schemes attempt to parse video content into "shots." A shot is defined as a number of sequential image frames comprising an uninterrupted segment of a video sequence. In parsing the video into shots, conventional media processing systems attempt to identify shot boundaries by analyzing consecutive frames for deviations in content from one frame to another.

One scheme for determining a transition point between shots in a video sequence involves the use of color histogram based segmentation. For example, this scheme generates a color histogram for each of a number of consecutive frames. These histograms are then analyzed to detect significant deviation between frames. A deviation that exceeds a particular deviation threshold is determined to indicate a shot boundary. Unfortunately, while such methods are useful for identifying particular shot boundaries, they fail to identify related shots that, when taken together form a continuous segment of related video, such as, for example, a complete music video which is typically comprised of a large number of shots.

Another related scheme automatically indexes a broadcast television type news video by indexing particular shots or scenes within the video by considering a correspondence of image contents and semantic attributes of "keywords." This scheme operates by first classifying shots or scenes based on graphical features of the shots, and then analyzing semantic attributes of accompanying text-type captions. Next, keywords derived from the accompanying text are selectively indexed to shots according to appropriate correspondence of typical shot classes and semantic attributes of keywords. However, while useful, this scheme is narrowly tailored to index news-type video broadcasts that include accompanying text captions. Consequently, such a scheme would likely perform poorly in other audio-video multimedia environments such as with music video type broadcasts.

Therefore, what is needed is a system and method for efficiently extracting or segmenting complete video objects from a media stream such as a broadcast television signal or streaming network broadcast by identifying the actual endpoints of each video object rather than merely identifying unique shots within the video stream. Further, such a system and method should be capable of extracting text information, when available for use in identifying, indexing, or cataloging each video object.

SUMMARY

A "music video parser" as described herein automatically detects and segments music videos embedded in a combined audio-video media stream. In general, the music video parser generally operates by automatically detecting the boundaries of music videos embedded in an audio-video media stream, then automatically segmenting those videos from the media stream or alternately, identifying the temporal position of the endpoints of the music videos within the media stream.

In general, the music video parser automatically detects the boundaries of music videos embedded in an audio-video media stream by integrating the results of a number of video and audio analysis techniques to efficiently and effectively parse music videos embedded in a multimedia broadcast stream. In particular, in alternate embodiments of the music video parser, one or more of video shot detection, black screen detection, audio type detection, audio transition detection, video text detection and video OCR are used in combination for detecting and segmenting music videos embedded in a multimedia stream.

The music video parser achieves detection and segmentation of music videos embedded in a multimedia stream using a 3-stage approach. Specifically, a "preprocessing stage" is used to analyze the multimedia stream to identify a number of potential music video boundary candidates. These potential boundaries are determined using a number of audio and video processing techniques, including shot detection, black screen detection, audio type detection, audio transition detection, and video text detection.

Once the preprocessing stage has identified potential music video boundary candidates, an "integration stage" is used to integrate the results of the preprocessing stage to refine and limit the number of potential music video boundary candidates by considering potential interrelationships between the audio and video processing techniques used in the initial preprocessing stage.

Finally, in a "final decision stage," the actual music video boundaries are identified by applying a set of media content analysis rules to small segments of the media stream between the potential music video boundaries to definitively identify actual music video boundaries.

Further, when available, in one embodiment, the music video parser automatically extracts information from the music video, such as, for example, a song name, artist name, album name, etc., is automatically extracted from the media stream using video optical character recognition (OCR). This information is then used in alternate embodiments for cataloging, indexing and selecting particular music videos, and in maintaining statistics such as the times particular music videos were played, and the number of times each music video was played.

In addition to the just described benefits, other advantages of the music video parser will become apparent from the detailed description which follows hereinafter when taken in conjunction with the accompanying drawing figures.

DESCRIPTION OF THE DRAWINGS

The specific features, aspects, and advantages of the "music video parser" will become better understood with regard to the following description, appended claims, and accompanying drawings where:

DETAILED DESCRIPTION OF THE PREFERRED EMBODIMENTS

In the following description of the preferred embodiments of the music video parser, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
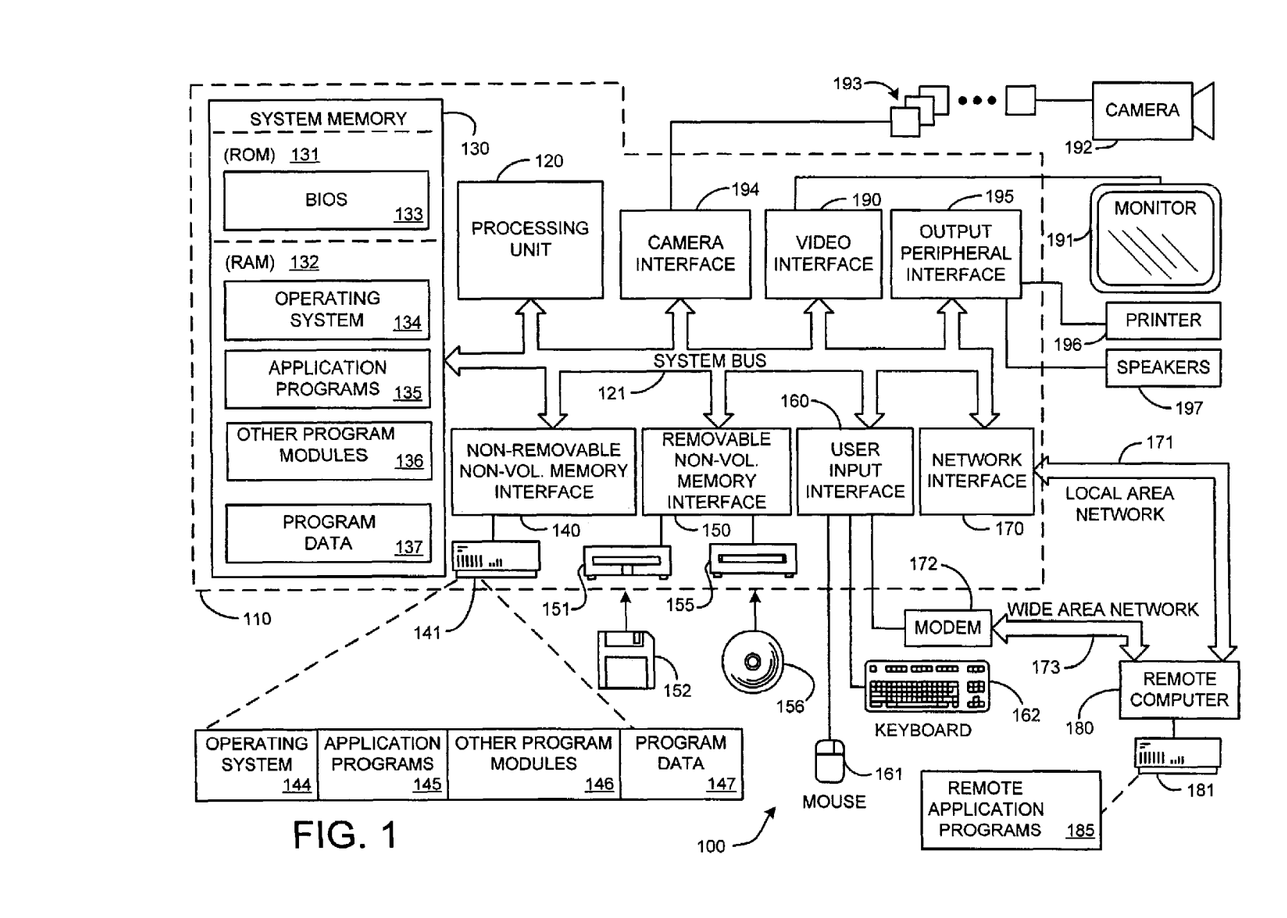
FIG. 1 is a general system diagram depicting a general-purpose computing device constituting an exemplary system for automatically detecting and segmenting music videos from a combined audio-video media stream.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatic detection and segmentation of music videos embedded in an audio-video media stream.

2.0 Introduction:

In general, a "music video parser," as described herein, automatically detects the boundaries of music videos embedded in an audio-video media stream by integrating the results of a number of audio and video analysis techniques. Once detected within the media stream, the music video parser then automatically segments those videos from the media stream or alternately, identifies the temporal position of the endpoints of the music videos within the media stream.

Figure 2:
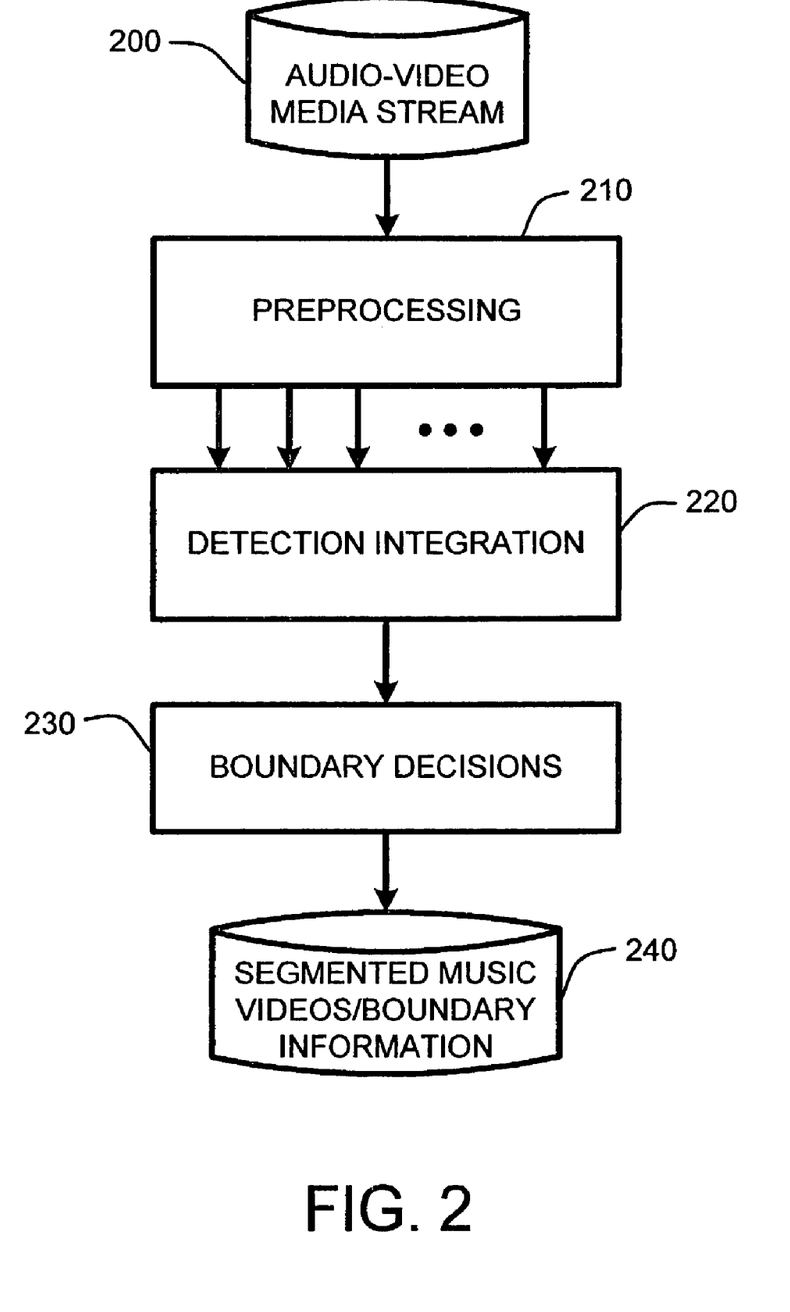
FIG. 2 is a high level flow diagram depicting an exemplary system for automatically detecting and segmenting music videos from a combined audio-video media stream.

2.1 System Overview:

As illustrated by flow diagram of FIG. 2, boundary detection of particular music videos within the multimedia stream is accomplished by integrating the results of a number of video and audio analysis techniques to efficiently and effectively parse music videos embedded in a multimedia broadcast stream. In particular, in alternate embodiments of the music video parser, one or more of video shot detection, black screen detection, audio type detection, audio transition detection, video text detection and video optical character recognition (OCR) are used in combination for detecting and segmenting music videos embedded in a multimedia stream.

In particular, the music video parser achieves detection and segmentation of music videos embedded in a multimedia stream using a 3-stage approach. Specifically, a "preprocessing stage" 210 is used to analyze the multimedia stream to identify a number of potential music video boundary candidates. These potential boundaries are determined using a number of audio and video processing techniques, including shot detection, black screen detection, audio type detection, audio transition detection, and video text detection.

Once the preprocessing stage 210 has identified potential music video boundary candidates, an "integration stage" 220 is used to integrate the results of the preprocessing stage to refine and limit the number of potential music video boundary candidates by considering potential interrelationships between the audio and video processing techniques used in the initial preprocessing stage.

Finally, in a "boundary decision stage," 230 the actual music video boundaries are identified by applying a set of media content analysis rules to small segments of the media stream between the potential music video boundaries to definitively identify actual music video boundaries. Once the boundaries have been identified, the corresponding music videos 240 are extracted from the media stream 200 and stored to a computer readable medium as either a computer file or database entry for later viewing or browsing, as desired. Alternately, the time index or frame numbers of each identified music video boundary are stored to allow for indexed browsing of the stored media stream 200.

Further, when available, in one embodiment, the music video parser automatically extracts information from the music video, such as, for example, a song name, artist name, album name, etc., is automatically extracted from the media stream using video OCR. This information is then used in alternate embodiments for cataloging, indexing and selecting particular music videos, and in maintaining statistics such as the times particular music videos were played, and the number of times each music video was played.

Figure 3:
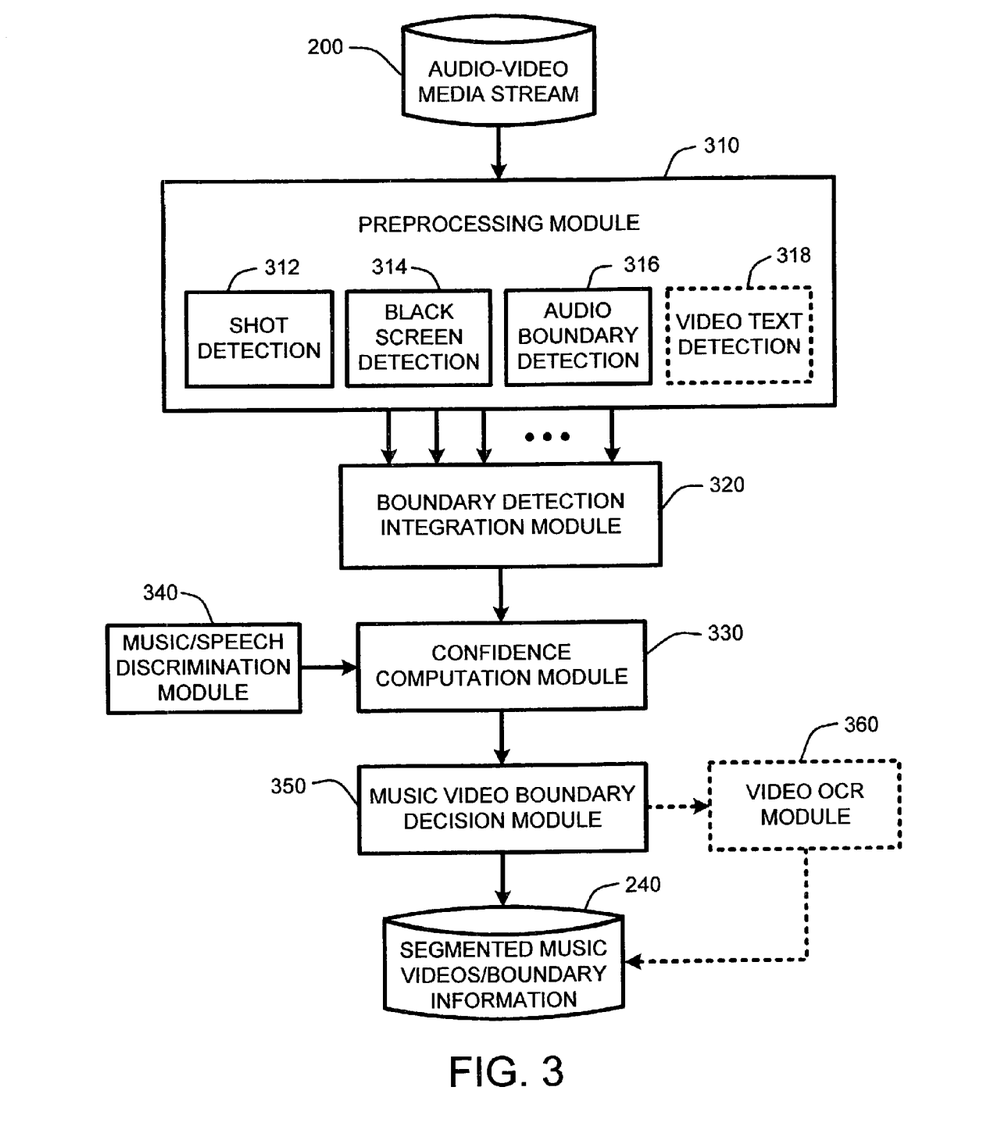
FIG. 3 illustrates an exemplary architectural diagram showing exemplary program modules for automatically detecting and segmenting music videos from a combined audio-video media stream.

2.2 System Architecture:

The general system diagram of FIG. 3 illustrates the processes generally described above. In particular, the system diagram of FIG. 3 illustrates interrelationships between program modules for implementing a "music video parser" for automatically detecting and segmenting music videos in an audio-video media stream. It should be noted that the boxes and interconnections between boxes that are represented by broken or dashed lines in FIG. 3 represent alternate embodiments of the music video parser, and that any or all of these alternate embodiments, as described below, may be used in combination with other alternate embodiments that are described throughout this document.

In general, as illustrated by FIG. 3, a system and method for automatically detecting and segmenting music videos in an audio-video media stream begins by providing the audio-video media stream 200 to a preprocessing module 310. In alternate embodiments, this preprocessing module 310 provides a number of video and audio boundary detection techniques including shot detection 312, black screen detection 314, audio boundary detection 316, and video text detection 318. As described in Section 3.3, the preprocessing module 310 operates by using one or more of the aforementioned boundary detection techniques (312-318) to compute potential music video boundaries within the media stream 200.

The preprocessing module 310 then provides the results of one or more of the boundary detection techniques (312-318) to a boundary detection integration module 320. The boundary detection integration module 320 then applies a set of one or more observation-based rules as described in Section 3.4 to integrate the independent results of the boundary detection techniques (312-318) in order to eliminate as many "false alarms" of potential music video boundaries as possible. The remaining potential boundaries are then passed to a confidence computation module 330 along with results from a music/speech discrimination module 340 which determines whether particular segments or portions of the media stream between the remaining detected potential boundaries represent music, or whether they instead represent advertisements or other non-music media content.

The confidence computation module 330 then uses the results of the analysis provided by the music/speech discrimination module 340 to eliminate those potential boundaries delimiting portions of the media stream representing media content other than music.

The remaining potential boundaries are then passed from the confidence computation module 330 to a music video boundary decision module 350. This music video boundary decision module 350 then applies a set of one or more observation-based rules as described in Section 3.7 in order to make a final determination as to which of the remaining detected potential boundaries actually represent the boundaries of music videos embedded in the media stream 200. Once those actual boundaries are identified by the music video boundary decision module 350, the corresponding music videos 240 are extracted from the media stream 200 and stored to a computer readable medium as either a computer file or database entry for later viewing or browsing, as desired. Alternately, the time index or frame numbers of each identified music video boundary are stored to allow for indexed browsing of the stored media stream 200.

Finally, in another embodiment, a video OCR module 360 automatically extracts textual information from the music video, such as, for example, a song name, artist name, album name, etc. As described in Section 3.3.4, the video OCR module operates in cooperation with the video text detection process 318 provided in the preprocessing module 310 to extract any relevant music video identification information. This information is then used in alternate embodiments for cataloging, indexing and selecting particular music videos, and in maintaining statistics such as the times particular music videos were played, and the number of times each music video was played.

3.0 Operation Overview:

As noted above, the music video parser generally operates by automatically detecting the boundaries of music videos embedded in an audio-video media stream, then automatically segmenting those videos from the media stream or alternately, identifying the temporal position of the endpoints of the music videos within the media stream. Specific details regarding implementation of the music video parser are provided in the following sections.

3.1 System Components:

As noted above, the music video parser automatically detects the boundaries of music videos embedded in an audio-video media stream, then automatically segments those videos from the media stream or alternately, identifies the temporal position of the endpoints of the music videos within the media stream. In another embodiment the music video parser automatically extracts information from the music video, such as, for example, a song name, artist name, album name, etc., using video OCR when text information is included in the image frames of the music video. This information is then used in alternate embodiments for cataloging, indexing and selecting particular music videos, and in maintaining statistics such as the times particular music videos were played, and the number of times each music video was played. Specific details regarding implementation of the music video parser are provided in the following sections.

3.2 Key Component Selection:

Typically, shot transitions and audio transitions exist at music video boundaries in an audio-video media stream. In addition, such music videos often include text information in several consecutive image frames at the beginning and/or the end of the music video. In addition, black screens are often used at the transitions between particular music videos or between music videos and advertisements. Further, audio in music videos often includes music rather than speech. Consequently, speech/music discrimination analysis techniques are used. This information, e.g., shot detection, black screen detection, video text detection, audio transition detection, and speech/music discrimination analysis, when analyzed and integrated by the music video parser, provides sufficient data for accurately and efficiently detecting and segmenting music videos from the media stream.

3.3 Preprocessing:

In the preprocessing stage, the media stream is independently processed using a number of audio and video analysis techniques to provide either a time index or frame number representing potential music video boundaries. In one embodiment, one or more of video shot detection (see Section 3.3.1), black screen detection (see Section 3.3.2), audio boundary detection (see Section 3.3.3), and video text detection (see Section 3.3.4) are used in the preprocessing stage for determining potential music video boundary points.

In a tested embodiment, the results of four of these analysis components, namely video shot detection, black screen detection, audio boundary detection, and video text detection are provided to an initial integration and segmentation stage (see Section 3.4) wherein the results of the preprocessing stage are jointly analyzed to determine potential music video boundaries. In addition, in this tested embodiment, a fifth analysis component, i.e., music/speech discrimination (see Section 3.5), is used to compute a confidence level for the purpose of determining whether the period between two detected boundaries represented music or speech such as an advertisement or other non-music video portions of the media stream. As described in Section 3.6, this confidence level provides a measure for determining whether particular portions of the media stream actually represent a music video.

3.3.1 Shot Detection:

As noted above, a video sequence is typically composed of one or more "shots." In general, a shot is defined as an uninterrupted temporal segment in a video sequence. Shots, in turn, are comprised of a number of sequential image frames. Thus, with music videos, as with any other type of video, each song begins and ends at shot boundaries. Thus, shot detection is required to determine the exact positions of song boundaries. However, relying on this technique alone typically produces a large number of "false alarms" as there are typically a large number of shots in any given music video. Thus, once shot boundaries are identified as described below, it is necessary to determine which shots actually represent boundaries of the music video, rather than merely boundaries of shots within a particular video.

Any of a number of shot boundary detection techniques may be utilized by the music video parser. However, shot boundary detection is generally based on the idea that consecutive frames on either side of a boundary generally display a significant change in content. Consequently, a quantitative measure can be calculated to reflect the difference between any such pair of frames. If the difference exceeds a given threshold, then a possible shot boundary is indicated.

For example, in one embodiment, shot boundary detection is accomplished by first identifying abrupt transitions in content between two image frames. Identifying such abrupt transitions between image frames in a video sequence is accomplished by calculating a difference in light intensity histograms between a current frame and a preceding frame, and comparing that histogram difference to a dynamically determined threshold, such that an abrupt transition, and thus, a shot boundary, is indicated if the histogram difference exceeds the threshold. In another embodiment, a shot boundary detector statistically analyzes one or more attributes associated with content in video frames to detect abrupt and/or gradual transitions in the video content indicative of a shot boundary. Such techniques are known to those skilled in the art, and will not be described in further detail herein.

Once detected within the media stream, the time index or frame number of each identified shot boundary is identified as representing potential music video boundaries.

3.3.2 Black Screen Detection:

A "black screen" is defined as one or more image frames in which most pixels are dark and those dark pixels are dispersed generally evenly throughout the entire region of the image frame. Any of a number of black screen detection algorithms may be used for detection of black screens. For example, in a tested embodiment, a simple image frame histogram was used to detect such black screens. In particular, those image frames in which the percentage of dark pixels is larger than a pre-defined threshold are identified as black screens.

In typical music videos, there are often black screens (i.e., a number of image frames showing only black content) between music videos or between a music video and an advertisement or other non-music video media content. Consequently, such black screens are often useful for detecting exact start and end frames of music videos. However, it has also been observed that such black screens may also exist during the period of a given music video. Thus, while black screen detection by itself is not a completely reliable indicator of music video boundaries, it is useful as an indicator of potential music video boundaries.

Once detected within the media stream, the time index or frame number of each identified black screen is identified as representing potential music video boundaries.

3.3.3 Audio Boundary Detection:

It has been observed that there are detectable audio transitions between different music videos or between a music video and an advertisement or other non-music video media content. Consequently, the identification of such boundaries is useful in identifying potential music video boundaries. While any of a number of techniques may be used for detecting such audio boundaries in a media stream, in a tested embodiment, audio boundary detection was based on audio similarity of sub-clips of the audio component of the media stream. Such sub clips can be of any desired length. However, it has been observed that sub-clips or sub-segments on the order of around one to three seconds in length with overlap between the segments provides good results when searching for audio transitions in a media stream. In addition, in order to reduce computational complexity of the audio boundary detection, the audio component of the media stream can be downsampled without adversely affecting the ability to detect audio transitions.

In particular, in the aforementioned tested embodiment, a Mel-frequency cepstral coefficient (MFCC) and energy information were used to measure the similarity between two audio sub-clips by using the Kullback-Leibler distance (i.e., the "K-L distance"), $$D(p,q)=tr[(C_p-C_q)(C_q^{-1}-C_p^{-1})] \qquad \text{Equation 1}$$

where $C_p$ and $C_q$ represent the MFCC or energy covariance of $p^{th}$ and $q^{th}$ audio sub-clip.

The covariance of each audio sub-clip can be easily estimated by from its feature vector set as illustrated by Equation 2:

$$C_p = E[(x_p - u_p)(x_p - u_p)^T]$$ Equation 2 where $x_p = \{x_{p,1}, x_{p,2}, \ldots, x_{p,N}\}$ is N feature vectors for $p^{th}$ audio sub-clip and $u_p$ is the average vector of $x_p$.

Note that the concept of the Kullback-Leibler distance is well known to those skilled in the art, and will not be discussed in detail herein. In general, the Kullback-Leibler distance can be considered as a kind of a distance between two probability densities.

For example, in a tested embodiment, the audio component of the media stream was first down-sampled into an 8 KHz, 16 bit, mono channel audio signal and pre-emphasized. The downsampled audio stream was then divided into 3-second window sub-segments with 2.5-second overlapping to provide a step or resolution of 0.5 seconds. Each sub-segment was then further divided into non-overlapping frames of 25 ms in length. Features such as the MFCC vector and short-time energy (STE) are extracted from each frame using conventional techniques.

This extracted information is then compared to identify audio transitions, and thus potential music video boundaries. In particular, if a computed dissimilarity between two neighboring audio sub-segments is larger than a pre-defined threshold at a particular time slot, then the sub-segments are identified as representing an audio boundary.

For example, let $D(i,j)$ denote the MFCC distance between the $i^{th}$ and $j^{th}$ audio sub-segment. Then, an audio boundary is detected between $i^{th}$ and $(i+1)^{th}$ speech sub-segment, if the following three conditions are satisfied:

$$D(i,i+1) > D(i+1,i+2);$$

$$D(i,i+1) > D(i-1,i); \text{ and}$$

$$D(i,i+1) > Th_i$$ Equation 3 where $Th_i$ is a predetermined threshold.

The first two conditions guarantee a local peak exists, while the last condition can prevent very low peaks from being detected. Good results can be achieved by using this simple criterion; however, the threshold $Th_i$ is difficult to set a priori. In particular, if the threshold is too small, a large number of false audio transition detections will result. Conversely, if the threshold is set too high, then legitimate audio transition detections will be missed. Thus, in one embodiment, the threshold is automatically set based on its context.

In particular, in one embodiment, the threshold is automatically set according to the previous N successive distances as illustrated by Equation 4:

$$Th_i = \alpha \cdot \frac{1}{M} \sum_{m=0}^{M} D(i-m-1, i-m)$$ Equation 4 where M is the number of previous distances used for predicting threshold, and $\alpha$ is an amplifier coefficient. Thus, the threshold is adapted automatically in various contexts.

Finally, once detected within the media stream, the time index or frame number of each identified audio transition is identified as representing potential music video boundaries.

3.3.4 Video Text Detection:

It has been observed that in many cases involving music videos, text captions, such as, for example, the name of the song, singer, album, director, etc., occur at or near the beginning and/or the end of each music video. In addition, such song identification information is often displayed in text in the lower left quadrant of the screen, near the beginning and the end of each song. Further, even where such text captions are not at the exact beginning or end of the music video, such captions tend to be very close to the exact beginning and/or end of the music video. Consequently, such information, when available, is very useful in making a rough determination of the boundaries of each music video. Further, in one embodiment, Video OCR is used following such text detection to extract all the relevant music video identification information.

Therefore, the media stream is analyzed to identify the time index or frame number where text captions appear, as well as the time index or frame number when the captions disappear. However, it has been observed that in a typical media stream, there are large amounts of advertisements or commercials interspersed with the music videos in the media stream. Typically, these advertisements or commercials also contain a fairly large amount of text or text captions. It has also been observed that that music video text captions tend to be displayed for a longer period than advertisement or commercial text, and that music video text captions typically cover two or more adjacent rows. Based on these basic observations, a music video text caption detection algorithm is described in the following paragraphs.

There are a number of well-known techniques for locating and identifying text content in video frames. Therefore, such techniques will only be summarized herein, rather than described in detail. For example, one such approach accurately and robustly detects text areas in video frames by first applying a horizontal and vertical Sobel differential calculator, followed by an edge thinning process on the original image to obtain a vertical edge map, and a horizontal edge map. From the vertical edge map, candidate text areas are obtained. Then, by using horizontal edge alignment, false candidates are eliminated. Finally, a shape suppression technique based on Bayesian decision theory is used to avoid false candidates resulting from non-text texture areas. Once the areas of text have been identified, conventional OCR methods are used to identify the particular characters forming those text areas.

Another approach begins by detecting "corner points" of selected video frames. After deleting some isolate corners, the remaining corners are merged to form candidate text regions. The regions are then decomposed vertically and horizontally using edge maps of the video frames to get candidate text lines. Finally, a text box verification step based on the features derived from edge maps is taken to significantly reduce false alarms.

In a tested embodiment, the two aforementioned procedures are combined to produce a novel and reliable text detection method. Specifically, the aforementioned region decomposition method is adopted and combined with the edge detections and Bayesian decision techniques mentioned above to provide for accurate identification of text box boundaries. Further, in accordance with the aforementioned observations, only those image frames that contain at least two adjacent text lines are considered to be "music video caption frames." In this context, "adjacent" means that the distances between the top-left corners of two or more identified text lines are smaller than some predetermined threshold.

For example, these text detection techniques, in view of the aforementioned observations, were applied in a tested embodiment of the music video parser to identify those image frames in the media stream that contained adjacent lines of text.

In particular, let $\{x_1, x_2, x_3, \ldots, x_k\}$ denote the frame sequences of a music video, and $y_i$ denote a sub-sequence $\{x_i, x_{i+1}, \ldots, x_{i+m-1}\}$. Among the m consecutive video frames, if text can be detected in at least n frames, then those frames are considered to be frames that potentially contain music video captions, where, m and n represent thresholds that are best determined by experience. For example, suppose there are at least n frames that potentially contain text captions in $\{y_s, y_{s+1}, \ldots, y_{s+p-1}\}$ but there are at most n−1 frames that contain caption in $y_{s-1}$ and $y_p$. Then $\{x_s, x_{s+1}, \ldots, x_{(s+p-1)+(m-1)}\}$ are regarded as a sub-sequence that contains music video text captions. Thus, a caption appears at frame s and disappears at frame (s+p+m−2).

This information, i.e., the time period (time indices or frame numbers) where the caption is displayed, is then identified as representing areas very near potential music video boundaries.

3.4 Integration of Preprocessing Results:

The potential music video boundaries derived from each of the preprocessing methods discussed above, i.e., video shot detection, black screen detection, audio boundary detection, and video text detection, are individually prone to false alarms, or missed boundaries. Consequently, the use of any of these preprocessing methods alone tends to degrade parsing performance which segmenting music videos from the media stream. Consequently, two or more of these preprocessing results are integrated as described below to produce composite potential boundaries having higher confidence levels than can be produced by any of the preprocessing methods alone. These new potential music video boundaries are then used to provide an initial segmentation of the media stream.

Before, describing how the preprocessing results are integrated, it is useful to discuss a number of observations regarding typical music videos that are directly related to the manner in which each of the preprocessing results can best contribute to an overall integration system for determining optimal segmentation points in the media stream.

First, as noted above, shots change quickly and frequently in a typical music video. Thus, there are typically too many shot boundaries to be used alone in a practical music video parsing algorithm. However, by their nature, shot boundaries are useful for providing an accurate position for music video transition points. Consequently, as described below, the detected shot boundaries are used to adjust segmentation points in the media stream.

Next, in typical music video programming, there is often a black screen between different music videos and advertisements or other media content. As described above, black screen detection is a relatively straightforward process. Further, because of where such black screens tend to occur, they provide for accurate segmentation points than the other preprocessing results. Black screens often occur over a short time period which corresponds to one or more black, or nearly black, image frames. For convenience, the temporal position of the "blackest" of those frames is considered to be the position of the black screen, with the positions of any adjacent black frames simply being ignored.

The next observation relates to text information in typical music videos. Usually, but not always, text information, such as song name, artist name, and album name, is shown near the beginning and end of a music video. Further, it is only rarely if ever placed into the actual body of a music video. Consequently, when such information is available, it is used in one embodiment as a kind of evidence for helping to identify which potential boundaries are likely to be actual music video boundaries.

Finally, in the process of finding potential music video boundaries, any detected audio boundaries are used as a base line. In particular, as a first pass, an analysis of audio boundaries is used to determine whether a potential boundary represents a false alarm. In other words, whether or not a detected audio boundary actually represents a potential music video boundary in view of the potential music video boundaries based on shot, text and black screen detection results, as described above. In particular, in view of these observations, a set of rules have been developed for identifying false alarms of music video boundaries with respect to detected audio boundaries:

1. If there is text and a black screen near a detected audio boundary, then the audio boundary is a potential music video boundary, and the position of potential music video boundary set to the position of the nearby black screen.
2. If there is text and a shot transition, but no black screen, near the audio boundary, then the audio boundary is a potential music video boundary and the position of the potential music video boundary is set to the position of the nearest shot transition.
3. If there is text, but no black screen or shot transition near the audio boundary, and the confidence of the audio boundary the high, then the audio boundary is a potential music video boundary. In this case, the position of the potential music video boundary is as same as the detected audio boundary.
4. If there is a black screen and a shot transition, but no text near the audio boundary and the confidence of the audio boundary is very high, then the audio boundary is a potential music video boundary. In this case, the position of the potential music video boundary is set to be the same as that of the black screen.
5. If there is no text, shot or black screen near an audio boundary, but the confidence of the detected audio boundary is extremely high, it is again considered to be a potential music video boundary. Again, in this case, the position of the potential music video boundary is as same as the detected audio boundary.
6. In all other cases, any detected audio boundary is considered to be a false alarm for a music video boundary.

The rules described above are applied to each detected audio boundary. In this manner, a majority of audio boundary false alarms can be removed. However, it should be noted that some audio boundaries may be missed during detection as the result of a number of factors, such as, for example music or audio cross-fading or voiceovers near the beginning or ending of particular music videos. Because missing such audio boundaries may result in missed music video boundaries, another rule is applied after the first pass analysis described above. In particular, this last rule is:

7. If there is a black screen near a shot boundary, and the confidence of black screen is very high, there is a potential song boundary having a position that is the same as that of the black screen.

Finally, because some boundaries are repeated and some are very close to each other temporally, a "cleaning method" is applied to the remaining potential song boundaries in order to further limit or reduce the total number of potential song boundaries. This cleaning method applies several additional rules for further limiting music video boundary false alarms:

8. For temporally close potential music video boundaries, any one that includes a black screen is kept, while the others are removed or ignored. However, if there is no potential boundary including a black screen, the one with highest confidence will instead be kept.
9. Finally, another rule that may be applied to remove false alarms of potential boundaries is that if the position of a boundary is in the middle of text duration, the boundary should be removed, as it is unlikely that a particular text caption will extend across the actual music video boundary.

3.5 Music/Speech Discrimination:

In order to determine whether a particular segment of the media stream is part of a music video, or simply part of some other non-music video portion of the media stream, audio sub-clips are analyzed and classified as either music or speech. If a particular audio segment is music-dominated, then it is considered to potentially represent a portion of a song or music video.

Audio classification is used to classify each sub-clip of the audio portion of the media stream. Such audio classification is capable of classifying audio into speech, music, several types of environmental sounds and silence using a feature-based audio content analysis. In general, features extracted from the audio include the short-time energy, the zero-crossing rate, the spectral information of audio signals, as well as statistical and morphological features of these components. Given these features, classification of the audio is achieved through a machine learning and pattern recognition procedure.

Audio classification can be accomplished by using any of a number of conventional methods. For example, one conventional method applies "support vector machines" (SVMs) in audio segmentation and classification. A number of audio classes can be considered: e.g., silence, music, background sound, pure speech, and non-pure speech which includes speech over music and speech over noise. A SVM learns optimal class boundaries from training data to best distinguish between two classes. Audio clips can then be classified as any of these five classes. Such audio content classification techniques are well known to those skilled in the art, and will not be described in further detail herein.

In a tested embodiment, 0.5 second audio sub-clips were selected as music/speech discrimination units. Several features, such as High Zero-Crossing Rate Ratio (HZCRR), Low Short-Time Energy Ratio (LSTER), Spectrum Flux (SF), and Band Periodicity (BP), are then extracted from each audio sub-clip. A kernel support vector machine (SVM), as noted above was used as the classifier for classifying particular sub-clips as either music, or as non-music. Once classified, the audio sub-clips are used in the manner described below in Section 3.6 for further reducing the number of potential music video boundaries by eliminating false alarms.

3.6 Confidence Computation:

After reducing the number of potential boundaries using the observation-based rules described above, the results of music/speech discrimination, as described above, are used to decide if the period between two boundaries is music, advertisement or some other non-music media. In this determination, the music ratio is used as a measure of confidence. In particular, if the music ratio is high and the duration is sufficiently long, then it is likely that the potential boundary is within the music video or actually bounding the beginning or end of the music video. Otherwise, the potential boundary likely represents an advertisement or other video information and it is simply discarded.

At this point, the number of potential boundaries has been significantly reduced from those determined during preprocessing of the media stream. However, a final decision must still be made as to which of the potential boundaries represent actual music boundaries, and which do not. This decision process is described in the following section.

3.7 Final Music Video Boundary Decision:

After the preprocessing result integration procedures described above, the video data is divided into small segments delimited by the potential remaining music video boundaries. In the final decision stage, these segments will be classified as either music, or as an advertisement or other non-music segments. This decision is made in accordance with one or more of the following rules:

1. If there is text information in the beginning and the end of the segment, and the length represents a reasonable song length, e.g., from about two to about six minutes, depending upon the type of music, and the music ratio is not very low, the segment is considered to represent a complete music video.
2. In another embodiment involving two or more adjoining segments, if there is text information in the beginning of the first segment and there is text information in the end of the last segment, the total length of the combined segments together represents a reasonable song length, and the combined music ratio of these segments is not very low, these segments are combined to represent a single complete music video.
3. In a related embodiment, if there is only text information at the beginning or the end of a set of adjacent segments, and if the combined music ratio is high, then those segments are combined should be combined to represent a single complete music video.
4. In another embodiment, if there is no text information in a segment, but the length of that segment represents a reasonable song length, and the music ratio is very high, then the segment is considered to represent a complete music video.
5. Finally, in another embodiment, if there is no text information in the segment, the music ratio is not high or very low, but its length is close to a regular song length, then the segment is considered to represent a complete music video.

Once the boundaries have been identified, the corresponding music videos 240 are extracted from the media stream 200 and stored to a computer readable medium as either a computer file or database entry for later viewing or browsing, as desired. Alternately, the time index or frame numbers of each identified music video boundary are stored to allow for indexed browsing of the stored media stream 200.

4.0 System Operation:

As noted above, the program modules described in Section 2.2 with reference to FIG. 3, and in view of the detailed description provided in the preceding Sections, are employed in a "music video parser" that provides a system and method for automatically detecting and segmenting music videos in an audio-video media stream. This process is generally depicted in the flow diagram of FIG. 4. It should be noted that the boxes and interconnections between boxes that are represented by broken or dashed lines in FIG. 4 represent alternate embodiments of the music video parser, and that any or all of these alternate embodiments, as described below, may be used in combination with other alternate embodiments that are described throughout this document.

Figure 4:
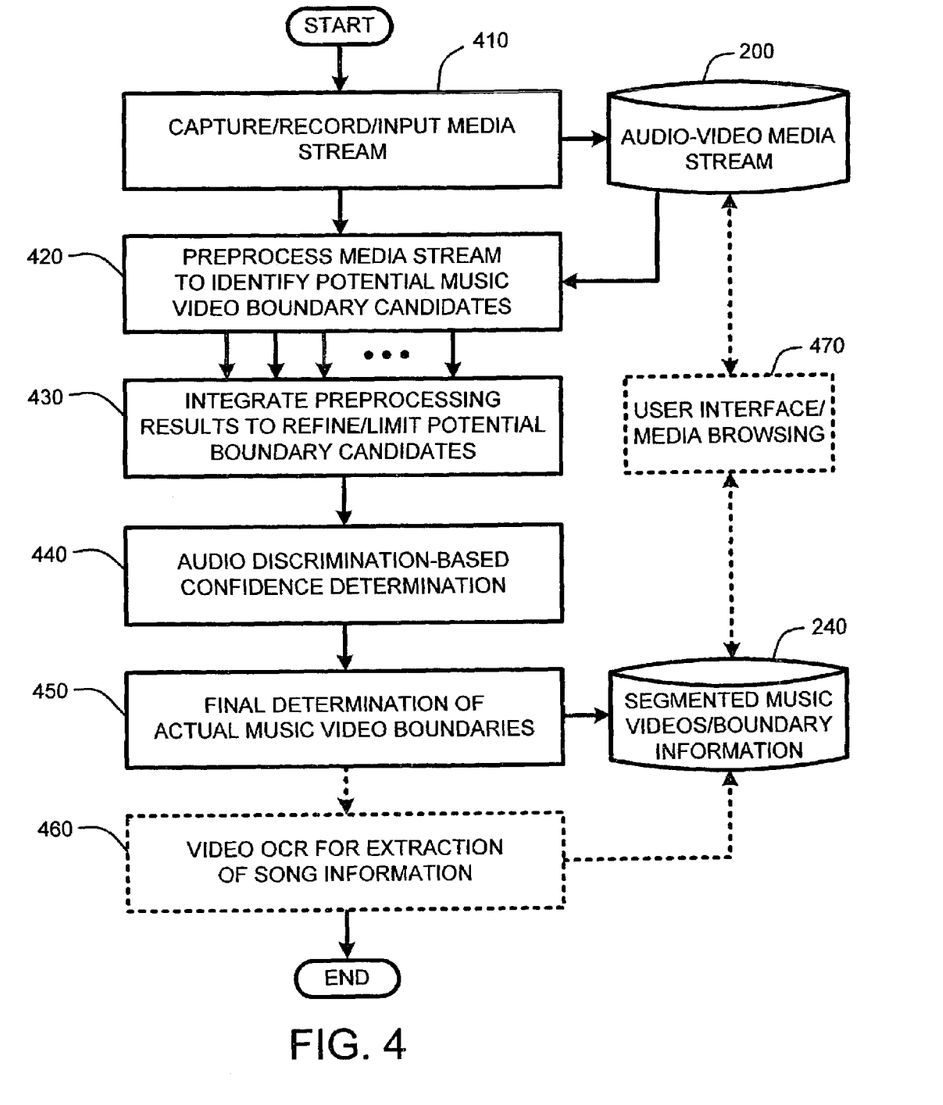
FIG. 4 illustrates an exemplary system flow diagram for automatically detecting and segmenting music videos from a combined audio-video media stream.

Referring now to FIG. 4 in combination with FIG. 3 in view of the detailed description provided in Section 3, the process can be generally described as a system for automatically detecting and segmenting music videos in an audio-video media stream. In general, as illustrated by FIG. 4, an audio-video media broadcast stream is captured or recorded 410 using any of a number of well known conventional techniques. Alternately, a prerecorded media stream 200 is provided on a computer readable media for analysis and parsing of music videos. In either case, the media stream 200 is preprocessed 420 using a group of independent boundary detection algorithms to identify potential music video boundaries within the media stream 200.

In particular, this preprocessing 420 of the media stream 200 involves detecting transitions within the media stream that correspond to potential music video boundaries. While any of a number of boundary detection techniques may be used, in tested embodiments video and audio boundary detection techniques included shot detection, black screen detection, audio boundary detection, and video text detection. As a result, preprocessing 420 of the media stream 200 provides a large number of independently derived potential boundary points within the media stream, with each of these potential boundary points possibly corresponding to start or end times of music videos embedded in the media stream.

As noted above, preprocessing 420 of the media stream 200 provides a large number of potential boundaries. Consequently, it is necessary to reduce or eliminate those boundary points that do not correspond to actual music video boundaries, i.e., eliminate "false alarm" potential boundary points.

Elimination of the false alarms is accomplished by integrating 430 the independent results produced by the preprocessing 420 of the media stream 200. In particular, this integration 430 of the preprocessing results is accomplished by automatically applying a set of observation-based rules to the set of potential boundary points. These observation-based rules, as described in Section 3.4 serve to eliminate as many "false alarms" of potential music video boundaries as possible.

The remaining potential boundaries are then processed in a second analysis stage in order to further reduce false alarms. In particular, an audio discrimination-based confidence determination 440 is computed. As discussed above, this computation involves determining whether segments of the media stream bounded by consecutive or adjacent potential boundaries represent music, or whether the segments represent other media content such as speech. Where the audio discrimination analysis indicates a high music ratio of sufficiently long duration, the potential boundaries on either side of that segment are kept as being viable potential boundaries, as it is likely that the potential boundary is within the music video or actually bounding the beginning or end of the music video. Otherwise, the potential boundary likely represents an advertisement or other video information and it is simply discarded.

The remaining potential boundaries are then processed in a third analysis stage in order to make a final determination of actual music video boundaries 450. This final determination 450 is accomplished by applying a set of one or more observation-based rules as described in Section 3.7 in order to determine which of the remaining detected potential boundaries actually represent the boundaries of music videos embedded in the media stream 200. Once those actual boundaries are identified by the music video boundary decision module 350, the corresponding music videos 240 are extracted from the media stream 200 and stored to a computer readable medium as either a computer file or database entry for later viewing or browsing, as desired. Alternately, the time index or frame numbers of each identified music video boundary are stored to allow for indexed browsing of the stored media stream 200.

Finally, in another embodiment, a video OCR 460 is used to automatically extract textual information from the music video, such as, for example, a song name, artist name, album name, etc. As described in Section 3.3.4, this video OCR operates in cooperation with the video text detection process provided as a part of the media stream 200 preprocessing 420 to extract any relevant music video identification information. This information is then used in alternate embodiments for cataloging, indexing and selecting particular music videos, and in maintaining statistics such as the times particular music videos were played, and the number of times each music video was played. In addition, in one embodiment, a user interface 470 is provided for viewing or browsing of the parsed music videos.

The foregoing description of the music video parser has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for automatically detecting and segmenting music videos in an audio-video media stream, comprising:
preprocessing a media stream using a plurality of boundary detection methods to locate a plurality of potential music video boundaries within the media stream;
jointly evaluating the potential music video boundaries to identify one or more of the potential music video boundaries that are not likely to be a part of an actual music video;
eliminating from further consideration the identified potential music video boundaries that are not likely to be a part of an actual music video; and
analyzing the content of segments of the media stream between any remaining potential music video boundaries to determine whether the content between any two or more potential music video boundaries represents an actual music video.

2. The system of claim 1 further comprising performing audio discrimination of the media stream to eliminate one or more of the remaining potential music video boundaries where the eliminated potential boundaries are determined to represent portions of the media stream that are not likely to be a part of a music video prior to analyzing the content of segments of the media stream.

3. The system of claim 1 further comprising identifying start and end points for each music video in the media stream from the remaining potential music video boundaries.

4. The system of claim 3 further comprising segmenting each music video from the media stream and storing the music videos on a computer readable medium.

5. The system of claim 1 wherein the boundary detection methods include any of shot detection, black screen detection, audio boundary detection, and video text detection.

6. The system of claim 1 wherein determining whether the content between any two or more potential music video boundaries represents a music video comprises identifying the content as a music video when there is text information in the beginning and the end of the content and the length of the content is on the order of an average song length.

7. The system of claim 1 wherein determining whether the content between any two or more potential music video boundaries represents a music video comprises identifying the content as a music video when:
   there is text information in the beginning of a first section of content between two potential music video boundaries and there is text information in the end of a subsequent adjacent section of content between two potential music video boundaries;
   a total length of the adjacent sections of content when combined is on the order of an average song length; and
   a combined music ratio of these adjacent sections is greater than a predetermined threshold.

8. The system of claim 1 wherein determining whether the content between any two or more potential music video boundaries represents a music video comprises identifying the content as a music video when:
   there is text information in either the beginning of a first section of content between two potential music video boundaries or the end of an adjacent second section of content between two potential music video boundaries;
   a total length of the adjacent sections of content when combined is on the order of an average song length; and
   a combined music ratio of these adjacent sections is greater than a predetermined threshold.

9. The system of claim 1 wherein determining whether the content between any two or more potential music video boundaries represents a music video comprises identifying the content as a music video when:
   there is no text information in a section of content between two potential music video boundaries;
   a total length of the section of content is on the order of an average song length; and
   a music ratio of the section of content is greater than a predetermined threshold.

10. The system of claim 1 wherein determining whether the content between any two or more potential music video boundaries represents a music video comprises identifying the content as a music video when:
    there is no text information in a section of content between two potential music video boundaries;
    a total length of the section of content is approximately an average song length; and
    a music ratio of the section of content is not less than a predetermined minimum threshold.

11. The system of claim 1 further comprising performing video optical character recognition on text within each music video to extract information related to each music video.

12. A computer-implemented process for automatically parsing music videos in an audio-video media stream, comprising:
    preprocessing a media stream using a plurality of boundary detection methods including one or more of shot detection, black screen detection, audio boundary detection, and video text detection to locate a plurality of potential music video boundaries within the media stream;
    jointly evaluating the potential music video boundaries to identify one or more of the potential music video boundaries that are likely to be a part of an actual music video;
    eliminating any potential music video boundaries from further consideration that are not identified as being likely to be a part of an actual music video; and
    analyzing the content of segments of the media stream between any two or more remaining potential music video boundaries to determine whether the content between any two or more potential music video boundaries represents an actual music video.

13. The computer-implemented process of claim 12 further comprising performing audio discrimination of the media stream to eliminate one or more of the remaining potential music video boundaries where the eliminated potential boundaries are determined to represent portions of the media stream that are not likely to be a part of a music video prior to analyzing the content of segments of the media stream.

14. The computer-implemented process of claim 12 further comprising identifying start and end points for each music video in the media stream from the remaining potential music video boundaries.

15. The computer-implemented process of claim 14 further comprising segmenting each music video from the media stream and storing the music videos on a computer readable medium.

16. The computer-implemented process of claim 12 further comprising performing video optical character recognition on text within each music video to extract information related to each music video.

17. A physical computer storage media having computer executable instructions for automatically extracting endpoint information for music videos embedded in an audio-video media stream, comprising:
    analyzing a media stream using one or more boundary detection methods including shot detection, black screen detection, audio boundary detection, and video text detection to locate a plurality of potential music video boundaries within the media stream;
    jointly evaluating the potential music video boundaries to identify one or more of the potential music video boundaries that are likely to be a part of an actual music video and eliminating any potential music video boundaries from further consideration that are identified as not being likely to be a part of an actual music video;
    performing audio discrimination of the media stream to eliminate one or more of the remaining potential music video boundaries where the eliminated potential boundaries are determined to represent portions of the media stream that are not likely to be a part of an actual music video; and
    analyzing the content of segments of the media stream between any two or more remaining potential music video boundaries to determine whether a segment of the media stream between any two or more potential music video boundaries represents an actual music video.

18. The physical computer storage media of claim 17 further comprising segmenting each music video from the media stream and storing the music videos on a computer readable medium.

19. The physical computer storage media of claim 17 further comprising performing video optical character recognition on text within each music video to extract information related to each music video.

20. The physical computer storage media of claim 17 wherein determining whether the content between any two or more potential music video boundaries represents a music video comprises identifying the segment as a music video when there is text information in the beginning and the end of the segment and the length of the segment is on the order of about two to six minutes.

21. A system for automatically parsing music videos in a composite audio-video media stream, comprising:

preprocessing a composite audio-video media stream using a plurality of boundary detection methods to locate a plurality of potential music video boundaries within the media stream;

jointly evaluating the potential music video boundaries to identify one or more of the potential music video boundaries that are likely to be a part of an actual music video;

eliminating any potential music video boundaries from further consideration that are not identified as being likely to be a part of an actual music video; and analyzing the content of segments of the media stream between any remaining potential music video boundaries to determine whether the content between any two or more of the remaining potential music video boundaries represents a complete music video.

22. The system of claim 21 wherein the boundary detection methods include at least one of:

shot detection;

black screen detection;

audio boundary detection;

audio discrimination analysis; and video text detection.

23. The system of claim 21 further comprising identifying start and end points for each music video in the media stream from the potential music video boundaries.

24. The system of claim 23 further comprising segmenting each music video from the media stream and storing the music videos on a computer readable medium.

* * * * *